June 14, 1955  C. R. BONNELL  2,710,941
ELECTROMECHANICAL AMPLIFIER
Filed Aug. 3, 1953

INVENTOR.
CHARLES R. BONNELL
BY George H Fisher
ATTORNEY

United States Patent Office 2,710,941
Patented June 14, 1955

2,710,941

ELECTROMECHANICAL AMPLIFIER

Charles R. Bonnell, Minneapolis, Minn., assignor to Minneapolis-Honeywell Regulator Company, Minneapolis, Minn., a corporation of Delaware Application August 3, 1953, Serial No. 372,026

15 Claims. (Cl. 323—90)

My invention relates to mechanically stabilized amplifying equipment and more particularly to an improved electromechanical amplifier.

Mechanically stabilized amplifiers or electromechanical amplifiers are known and have been used in the past to provide for stability, linearity, and ruggedness in amplifying equipment. However, the prior art devices have required rather complex equipment such as meter movements or beam balances which still presented the need for greater ruggedness and stability as well as simplicity in design. In my improved electromechanical amplifier, a single stator core and a single rotor element are utilized and with this equipment two torquing functions and a signal generation function are available to provide a very simplified amplifier design having good linearity and stability. In my improved amplifier, there are no windings on the rotor element and consequently no slip rings or flex leads are required to provide extraneous torques or frictions.

It is therefore an object of my invention to provide an improved electromechanical amplifier. It is also an object of my invention to provide in an improved electromechanical amplifier design a single stator and rotor element which will perform a plurality of torquing and a single signal generation operation. It is further an object of my invention to provide a simplified amplifier design having good linearity and stability yet providing a rugged construction with a minimum number of parts which is economical to manufacture and maintain. These and other objects of this invention will become apparent from a reading of the attached description together with the drawings wherein:

Figure 1:
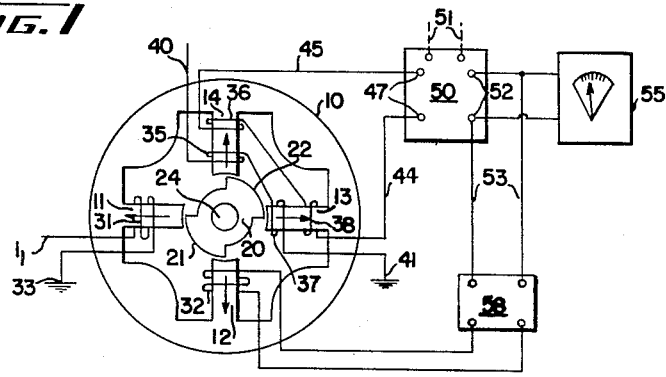
Figure 1 is a schematic disclosure of one embodiment of the invention.

In Figure 1 it will be seen that my improved electromechanical amplifying apparatus is comprised of a single stator element 10 having four poles 11, 12, 13 and 14 of the salient type. The stator is made of a soft magnetic material and is laminated in construction, the laminations being held together by suitable means (not shown). Positioned within the stator is a bi-polar rotor element 20 having pole faces or poles 21, 22, adapted to cooperate with the salient poles of the stator. The rotor 20 is also of a laminated magnetic material and is not permanently magnetized, the laminations being held together by suitable means (not shown) and having an aperture therein indicated at 24 through which a suitable shaft (not shown) is positioned to mount the rotor for pivotal rotation relative to the stator. For a more complete description of the structural details of the stator and rotor of this apparatus, reference is made to my co-pending application on "Improved Dynamoelectric Device," filed September 4, 1953, as Serial No. 378,456.

The rotor 20 is adapted to be mounted within the stator for limited pivotal rotation relative to the stator poles and as will be seen in Figure 1, the faces of the poles 21 and 22 subtend or span substantially the distance between center lines of the adjacent poles. The rotor with its cooperating shaft is adapted to be mounted in a suitable casing or framework (not shown) and pivoted or journaled therein (not shown) which casing would also mount the stator 10.

In my improved amplifier, one-half of the rotor and stator will perform the torque generation operations and the other half of the rotor and stator perform a signal generation operation. Thus in Figure 1, the poles 11 and 12 cooperate with the pole 21 of the rotor 20 to provide a torque generation application, the pole 11 having a winding 31 thereon and the pole 12 a winding 32 thereon. The winding 31 is adapted to be connected to a D. C. source of power such as is indicated by $i_1$, the opposite extremity of the winding 31 being grounded as at 33. This winding is the signal input winding to the torquer and when energized will cooperate with the pole face 21 of the rotor 20 to cause the rotor element 20 to rotate toward pole 11. The winding 32 on pole 12 will hereinafter be described as a feedback winding and when energized with a direct current signal of the same polarity as the input signal, though of differing magnitude, will attract the rotor or the pole face 21 in a direction opposite to that of the attraction caused by the energization of the winding 31. This type of torquing operation provides for the use of a single magnetomotive force along each polar axis of the torquer, the direction of torque being controlled by the magnitudes of the respective currents in the windings. As will be later noted, the winding 32 is energized by a feedback signal from the signal generating portion of the apparatus to be hereinafter described.

The signal generating portion of the stator and rotor is comprised of poles 13 and 14 together with the pole face 22 of rotor 20. The poles 13 and 14 have respectively a pair of windings thereon, 35, 36, 37 and 38. The windings 35 and 37 are connected together in a series connection and to an alternating current source of power indicated at 40 and ground connection 41. The coils 35 and 37 when energized provide a magnetomotive force pattern with respect to each of the poles which is in the same direction with respect to the rotor. These windings are known as the exciting windings of the signal generator. The windings 36 and 38 are also serially connected with their extremities connected by conductors 44, 45, leading to a pair of input terminals 47 of an amplifier indicated diagrammatically at 50. Winding 38 is so wound on pole 13 that with respect to its exciting winding 37 and windings 35, 36, it is in an opposite direction or sense. Thus with displacement of the rotor 20 with respect to the poles 13 or 14, the exciting flux is increased through one or the other of the secondary windings 36 or 38, and since these windings are wound in opposition and serially connected the output therefrom depending upon the direction of rotation of the rotor from the neutral position wherein it spans substantially equally both of the poles 13 and 14 will provide an output which is variable in magnitude and reversible in phase.

Amplifier 50 is shown herein in block form, it being understood that any conventional current or voltage amplifier may be used depending upon the type of output signal desired. Conductors 51 connected to the amplifier 50 indicate a conventional power supply for the amplifier and terminals 52 indicate the output of the device. It will be noted that the winding 32 or the feedback winding is connected by conductors 53 to the output terminals 52 of the amplifier through a suitable current shunting or voltage dividing device such as indicated by block 58 if desired to proportion the amount of signal feedback to the torque generator. It will also be noted that a meter indicated at 55 is also connected to the output terminals 52 of the amplifier such that an indication of the magnitude of the amplified signal may be obtained. It will be understood, however, that any suitable control device may similarly be connected to utilize the amplified signal for controlling purposes. The coil 32 is connected to the output terminals 52 of amplifier 50 by conductors 53 to provide a feedback function from the signal generator to the torque generator which, as previously indicated, energizes the coil 32 on pole 12 and cooperates with rotor face 21 to attract the rotor face in opposition to the operation of the input coil 31 of pole 11. The resulting operation is a torque balance of the input torque which will cause the rotor element to stabilize at a position depending upon the relative magnitudes of the input current and feedback current to the torquers. Depending upon the degree of amplification required from the apparatus, the amplifier 50 shown herein may or may not be required but the feedback connection between the signal generator and the torque generator provides for stability in the apparatus and would be included. In the event that the amplifying equipment is not used, that is, that the amplifier 50 is not included, some means for rectifying the output of the signal generator would be required, it being noted that the output of the amplifier is direct current and the input signal to the torquer is also of the direct current type. An alternating current can be used both in feedback and input to the torque generator, but the use of alternating currents on the torque generator effects the linearity of the signal generator by summing with the signal output.

The operation of my amplifier is unidirectional inasmuch as input to the torquer is effective in displacing the rotor 20 in one direction only. In operation, the input signal causes displacement of the rotor which input signal to the torquer causes a resulting torque on the rotor 20 displacing the same and inducing in the output windings 36, 38 of the signal generator a signal which is variable in magnitude. This output signal is fed to the amplifier 50 to control the same, the amplifier having an output in 50 to control the same, the amplifier having an output in proportion to the input signal thereto which output is connected to the feedback coil 32 of the torque generator through the proportioning device 58. The resultant feedback operates on the rotor 20 to balance the torque generated by the input signal $i_1$ resulting in a balanced condition in the apparatus with the rotor displaced depending upon the relative difference between the input and feedback signals. The amplified output from the amplifier 50 which will be registered on the meter 55 can also be utilized to energize associated control equipment (not shown) and is directly proportional to the input signal $i_1$. This type of electromechanical amplifying equipment eliminates the need for vibrators or choppers before amplification can be obtained.

Figure 2:
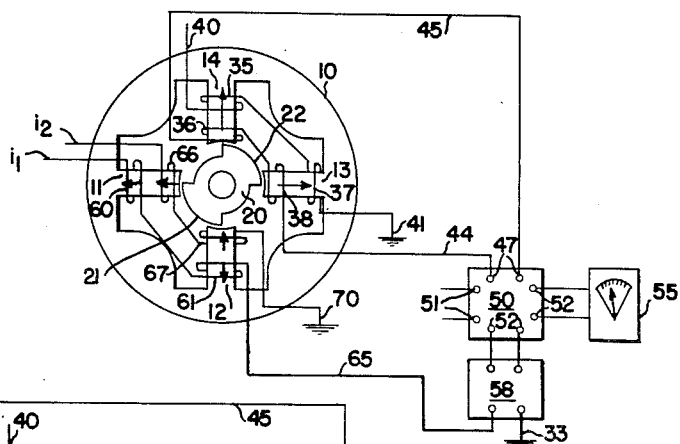
Figure 2 is a schematic disclosure of a second embodiment of the invention.

A second embodiment of this invention is shown in Figure 2 in which the structural details of a rotor and stator are the same as that discussed in connection with Figure 1 except for the winding arrangement. Consequently, a description of the magnetic structure of the apparatus is eliminated here for simplicity and the same numbers are utilized in connection with this embodiment as were applied to similar parts in the disclosure of Figure 1. It will be seen in Figure 2 that the signal generator portion of the apparatus is identical to that in connection with Figure 1, the poles 13 and 14 having exciting windings 35, 37 mounted thereon and energized from an A. C. signal or reference source 40, 41. Output windings 36, 38 are similarly wound as in Figure 1 and connected by conductors 44, 45 to an amplifier indicated schematically at 50. The rotor 20 with poles 21, 22 is similarly mounted for rotation relative to the stator poles to provide in the signal generator an output which is variable in magnitude and reversible in phase depending upon the displacement of the rotor from the neutral position in which the pole face 22 spans the poles 13 and 14 between center lines of the respective poles.

The torque generator portion of the apparatus is modified to provide a pair of windings for the poles 11 and 12. In this embodiment, the numbers 60 and 61 indicate input windings to the torque generator, the input windings being connected in series with one another and providing the same magnetomotive force pattern with respect to the rotor pole face 21. These input windings 60, 61 are energized from the direct current source $i_1$ and are connected in series by a conductor 65 with the proportioning device 58 connected to the output terminals 52 of the amplifier, the circuit being completed through the ground connection 33. A second winding 66, 67 respectively on each of the poles 11 and 12 provides a reference field for the torquer, these windings being connected in series and wound in opposition to one another to be energized by a reference signal source $i_2$ of constant magnitude, the circuit being completed through the grounded connections 70. The differential torque operation provided herein utilizes the principle of superimposed fields wherein the magnetomotive forces aid along one polar axis and buck along the other polar axis, the direction of torque or resulting torque being controlled by the magnitude and polarity of the respective signals. Thus for a given polarity of the input signal $i_1$ with respect to the reference signal $i_2$, and depending upon the relative magnitudes of the signals, the pole face 21 will be attracted toward the pole 11 or 12 causing displacement of the rotor 20 and the pole face 22 or polar projection of the rotor between poles 13 and 14 causing output of the signal generator through voltage induced in the coils 36, 38 which is variable in magnitude and reversible in phase depending upon the direction and magnitude of the displacement of the rotor from the neutral position. This output is fed to the amplifier 50 which in this embodiment is assumed to provide a D. C. output which is variable in magnitude and reversible in polarity depending upon the phase and magnitude of the input signal. Inasmuch as the output of terminals 52 of the amplifier 50 is connected in series relationship through proportioning device 58 with the windings 60, 61 of a torque generator and in series relationship with the input source $i_1$, in opposition to the same, the input signal will be modified by the feedback signal from the amplifier to provide a resultant torque operation tending to balance the torque produced by the input signal $i_1$ alone and providing for a resultant displacement of the rotor 20 with a resultant output of the signal generator and amplifier 50 in proportion to the magnitude of the input signal $i_1$. As disclosed in Figure 1, the output of the amplifier may be connected to a suitable metering device such as 55 or suitable controlling device (not shown). The degenerative feedback of the amplifier 50 on the input signal $i_1$ modifies the input to effect balance of the input torque and stability of the amplifier.

Figure 3:
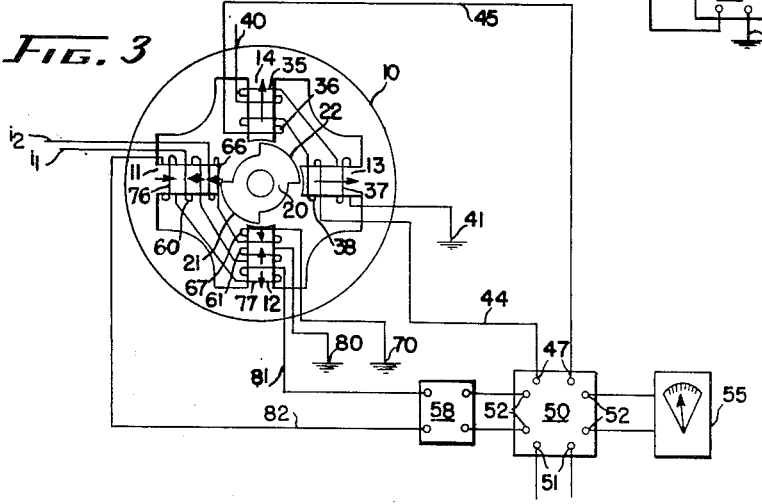
Figure 3 is a schematic disclosure of a third embodiment of the invention.

The modification of my improved electromechanical amplifier as shown in Figure 3 utilizes the same structural details of the stator and rotor as discussed in connection with Figures 1 and 2 and hence the details of the description are omitted here for simplicity. As in connection with Figures 1 and 2, the signal generator portion of the apparatus utilizes the poles 13 and 14 and rotor face 22 together with the excitation windings 35, 37 energized from the alternating current source and the output windings 36, 38 which are connected to the amplifier 50 to control the operation of the same. The torque generator in this embodiment is modified by the addition of a third winding for each pole, these windings being identified by the numbers 76, 77 and are to be described herein as feedback windings. The torque generator in this embodiment utilizes the reference windings 66, 67 energized from the reference source $i_2$ and the input windings 60, 61 energized by the D. C. input signal $i_1$. In this embodiment, however, the input windings are serially connected with the source $i_1$ and the connection to the amplifier is omitted, the windings being grounded as at 80 to complete the circuit to the source $i_1$. The input windings and the bias or reference windings are again wound in the same manner as that disclosed in Figure 2, the windings providing magnetomotive force pattern which aid along one polar axis and buck on the other polar axis of the poles 11 and 12. The windings 76 and 77 which are added in this embodiment are wound in opposition to the input windings to act against the same and are serially connected with one another to proportioning device 58 which in turn is connected to the output terminals 52 of amplifier 50. The torque generator winding configuration gives a differential torque operation which utilizes the principle of superimposed fields in which the magnetomotive forces aid along one axis and oppose along the other, direction of torque being controlled by the magnitude and polarity of the respective energizing signals of the torque generator. The input signal $i_1$ and the reference signal $i_2$ respectively cooperate to provide for resultant rotation of the rotor 20 and displacement of the rotor causing output of the signal generator through voltage induced in the coils 36, 38 and energization of the amplifier 50. The amplifier 50 provides an output of direct current which is variable in magnitude and reversible in polarity depending upon the phase and magnitude of the input signal to the amplifier, this output signal being fed to the coils 76, 77 or feedback coils of the torque generator which cooperate with the superimposed magnetic fields of the input windings and reference windings and cooperate with the rotor pole face 21 of rotor 20 to provide a resultant balancing torque operation effecting a force feedback on the torque generator. Inasmuch as the coils 76, 77 are wound in opposition to the input coils, this feedback is of the degenerative type tending to balance the input torque and stabilize the amplifier. In this embodiment, the resultant output of the amplifier 50 may be indicated on a meter such as 55 or may be connected to suitable control equipment for controlling operation (not shown). This embodiment like that of Figure 2 is reversible in sense or responsive to reversal of the polarity of input signal $i_1$, it being understood that the output of amplifier 50 is reversible in polarity and variable in magnitude depending upon the phase and magnitude of the input signal.

As previously indicated, alternating current type of energization for the torque generators could be used in connection with these embodiments of the electromechanical amplifier, however, but the linearity of the signal generator suffers due to the effective modulation of the energizing signals of the torque generator upon the output of the signal generator.

In considering this invention it is to be kept in mind that the present disclosure is intended to be illustrative only and that the scope of the invention is to be determined only by the appended claims.

I claim:

1. In an electromechanical amplifier, a stator having four salient poles, a rotor element of magnetic material pivoted within said stator and having two end faces spanning substantially the angle between centers of adjacent poles, a first pair of windings positioned on each of said poles adjacent one end face of said rotor element, means connecting one of said windings of each pair to an alternating current source of power, amplifying means, means connecting the other of said windings of each pair to said amplifying means, said first pair of windings cooperating with said one end face of said rotor element to provide an electrical signal generator, a second pair of windings positioned on each of said poles adjacent the other end face of said rotor element, means connecting one of said windings of each pair to a signal source and the other of said windings of said pair to a reference source, said second pair of windings cooperating with said other face of said rotor element to form a torque generator producing a torque on said rotor proportional to said signal input, and means connecting the output of said amplifying means to said one of said windings of each pair forming the torque generator.

2. In an electromechanical amplifier, a stator having four salient poles, a rotor element of magnetic material pivoted within said stator and having two polar projections spanning substantially the angle between centers of adjacent poles, a first pair of windings positioned on each of said poles adjacent one polar projection of said rotor element, means connecting one of said windings of each pair to an alternating current source of power, amplifying means, means connecting the other of said windings of each pair to said amplifying means, said first pair of windings cooperating with said one polar projection of said rotor element to provide an electrical signal generator, a second pair of windings positioned on each of said poles adjacent the other polar projection of said rotor element, means connecting one of said windings of each pair to a signal source and the other of said windings of said pair to a reference source, said second pair of windings cooperating with said other face of said rotor element to form a torque generator producing a torque on said rotor proportional to said signal input, and means connecting the output of said amplifying means to said torque generator to produce an effect in opposition to the operation caused by the energization of said torque generator by said signal source, the output of said amplifying means being proportional to the magnitude of said input signal.

3. In an electromechanical amplifier, a stator having four salient poles, a rotor element of magnetic material pivoted within said stator and having two polar projections spanning substantially the angle between centers of adjacent poles, a first pair of windings positioned on each of said poles adjacent one polar projection of said rotor element, means connecting one of said windings of each pair to an alternating current source of power, amplifying means, means connecting the other of said windings of each pair to said amplifying means, said first pair of windings cooperating with said one polar projection of said rotor element to provide an electrical signal generator, a second pair of windings positioned on each of said poles adjacent the other polar projection of said rotor element, means connecting one of said windings of each pair to a direct current variable input signal and the other of said windings of said pair to a reference direct current source, said second pair of windings cooperating with said other polar projection of said rotor element to form a torque generator producing a torque on said rotor proportional to said D. C. signal input, and means connecting the output of said amplifying means in series relation with said direct current signal input and said one of said windings of the torque generator, the output of said amplifying means being proportional to the magnitude of said D. C. input signal.

4. In an electromechanical amplifier, a stator having four salient poles, a rotor element of magnetic material pivoted within said stator and having two end faces spanning substantially the angle between centers of adjacent poles, a first pair of windings positioned on each of said poles adjacent one end face of said rotor element, means connecting one of said windings of each pair to an alternating current source of power, amplifying means, means connecting the other of said windings of each pair to said amplifying means, said first pair of windings cooperating with said one end face of said rotor element to provide an electrical signal generator, a second pair of windings positioned on each of said poles adjacent the other end face of said rotor element, means connecting one of said windings of each pair to a signal source and the other of said windings of said pair to a reference source, said second pair of windings cooperating with said other face of said rotor element to form a torque generator producing a torque on said rotor proportional to said signal input, and circuit means connecting the output of said amplifying means to one of said windings of said torque generator.

5. In an electromechanical amplifier, a stator having four salient poles, a rotor element of magnetic material pivoted within said stator and having two end faces spanning substantially the angle between centers of adjacent poles, a first pair of windings positioned on each of said poles adjacent one end face of said rotor element, means connecting one of said windings of each pair to an alternating current source of power, amplifying means, means connecting the other of said windings of each pair to said amplifying means, said first pair of windings cooperating with said one end face of said rotor element to provide an electrical signal generator, a second pair of windings positioned on each of said poles adjacent the other end face of said rotor element, means connecting one of said windings of each pair to a signal source and the other of said windings of said pair to a reference source, said second pair of windings cooperating with said other face of said rotor element to form a torque generator producing a torque on said rotor proportional to said signal input, and a degenerative feedback circuit means connecting the output of said amplifying means to one of said windings of said torque generator.

6. In an electromechanical amplifier, a stator having four salient poles, a rotor element of magnetic material pivoted within said stator and having two end faces spanning substantially the angle between centers of adjacent poles, a first pair of windings positioned on each of said poles adjacent one end face of said rotor element, means connecting one of said windings of each pair to an alternating current source of power, amplifying means, means connecting the other of said windings of each pair to said amplifying means, said first pair of windings cooperating with said one end face of said rotor element to provide an electrical signal generator, a second pair of windings positioned on each of said poles adjacent the other end face of said rotor element, means connecting one of said windings of each pair to a signal source and the other of said windings of said pair to a reference source, said second pair of windings cooperating with said other face of said rotor element to form a torque generator producing a torque on said rotor proportional to said signal input, and a degenerative feedback circuit means including a third set of windings one of which is mounted on each of said poles of said torque generator and wound in opposition to the windings energized by said signal source, said degenerative feedback circuit means being connected to said amplifier and energized thereby.

7. In an electromechanical amplifier, a stator having four salient poles, a rotor element of magnetic material pivoted within said stator and having two end faces spanning substantially the angle between centers of adjacent poles, a first pair of windings positioned on each of said poles adjacent one end face of said rotor element, means connecting one of said windings of each pair to an alternating current source of power, amplifying means, means connecting the other of said windings of each pair to said amplifying means, said first pair of windings cooperating with said one end face of said rotor element to provide an electrical signal generator, a second pair of windings positioned on said poles adjacent the other end face of said rotor element and forming with said rotor element a torque generator, means connecting one of said windings of said torque generator to a direct current signal source to produce a torque on said rotor proportional to said magnitude of said D. C. signal source, and means connecting the output of said amplifying means to the other of said windings to provide a force feedback on said torque generator.

8. In an electromechanical amplifier, a stator having four salient poles, a rotor element of magnetic material pivoted within said stator and having two polar projections spanning substantially the angle between centers of adjacent poles, a first pair of windings positioned on each of said poles adjacent one polar projection of said rotor element, means connecting one of said windings of each pair to an alternating current source of power, amplifying means, means connecting the other of said windings of each pair to said amplifying means, said first pair of windings cooperating with said one polar projection of said rotor element to provide an electrical signal generator, a second pair of windings positioned on said poles adjacent the other polar projection of said rotor element and forming with said rotor element a torque generator, means connecting one of said windings of said torque generator to a direct current signal source to produce a torque on said rotor proportional to said magnitude of said D. C. signal source, and means connecting the output of said amplifying means to the other of said windings to provide a force feedback on said torque generator, the output of said amplifying means being in proportion to the magnitude of the direct current signal source.

9. In an electromechanical amplifier, a stator having four salient poles, a rotor element of magnetic material pivoted within said stator and having two polar projections spanning substantially the angle between centers of adjacent poles, a first pair of windings positioned on each of said poles adjacent one polar projection of said rotor element, means connecting one of said windings of each pair to an alternating current source of power, amplifying means, means connecting the other of said windings of each pair to said amplifying means, said first pair of windings cooperating with said one polar projection of said rotor element to provide an electrical signal generator, a second pair of windings positioned on said poles adjacent the other polar projection of said rotor element and forming with said rotor element a torque generator, means connecting one of said windings to a D. C. signal source and the other of said windings to a reference source, said second pair of windings cooperating with said other polar projection of said rotor element to form a torque generator producing a torque on said rotor proportional to the magnitude of said D. C. signal source, and means connecting the output of said amplifying means to said torque generator in opposition to said D. C. signal source, the output of said amplifying means being proportional to the magnitude of said D. C. signal source.

10. In an electromechanical amplifier, a stator of magnetic material having four salient poles, a rotor element of magnetic material pivoted within said stator and having bi-polar projections spanning substantially the angle between centers of adjacent poles, a signal generator formed by a pair of said poles adjacent one polar projection of said rotor element and including a pair of windings on each of said poles, one winding of each pair on said poles being connected in series relation with an alternating current source of power and the other winding on each pole being connected in series relation and adapted to have a signal output produced therein in proportion to displacement of said rotor from a predetermined position in which said polar projection is disposed uniformly between said adjacent poles, a torque generator formed by the opposite pair of poles adjacent the opposite polar projection of said rotor and including a pair of windings mounted on each pole, means connecting one winding of each pole in a series relation to a direct current signal input source and the other pair of windings on each pole in a series relation to a direct current reference source, and means connecting the output of said signal generator to said first named windings of said torque generator to provide a feedback for stabilizing said device.

11. In an electromechnical amplifier, a stator of magnetic material having four salient poles, a rotor element of magnetic material pivoted within said stator and having bi-polar projections spanning substantially the angle between centers of adjacent poles, a signal generator formed by a pair of said poles adjacent one polar projection of said rotor element and including a pair of windings on each of said poles, one winding of each pair on said poles being connected in series relation with an alternating current source of power and the other winding on each pole being connected in series relation and adapted to have a signal output induced therein in proportion to displacement of said rotor from a predetermined position in which said polar projection is disposed uniformly between said adjacent poles, a torque generator formed by the opposite pair of poles adjacent the opposite polar projection of said rotor and including a pair of windings mounted on each pole, means connecting one winding of each pole in a series relation to a direct current signal input source and the other pair of windings on each pole in a series relation to a direct current reference source, amplifying means, means connecting the output of said signal generator to said amplifying means, and means connecting the output of said amplifying means to one of said pair of windings of said torque generators.

12. In an electromechanical amplifier, a stator having four salient poles and a bi-polar rotor element, said rotor in the neutral position subtending centers of adjacent poles, a signal generator formed by adjacent poles, common to one pole of said rotor and including a pair of windings on each pole, one winding of each pair being energized by alternating current source of power and the other winding of each pair being connected in an output circuit and adapted to having a voltage signal produced therein proportional to the displacement of said rotor, a torque generator comprising the other pair of poles of said stator common to the opposite pole extremity of said rotor and including an input winding on one of said poles adapted to cooperate with said rotor to rotate the same in proportion to the energization of said winding, and feedback circuit means including amplifying means connected to the output of said signal generator and including a winding on the other of said pair of poles forming said torque generator to balance the torque produced by the input signal on said torque generator.

13. In an electromechanical amplifier, a stator having four salient poles, a rotor element of magnetic material having two polar projections positioned within said stator and adapted to be rotated therein relative to said poles, said stator having a neutral position in which the poles thereof span substantially the angle between centers of adjacent poles of said stator, a signal generator including a plurality of windings on each of a pair of poles common to a rotor pole, one of said windings on each of said pair of poles being energized from an alternating current source of power and another winding on each of said pair of poles being adapted to have a signal voltage induced therein from the neutral position, a torque generator including a plurality of windings on the other pair of said poles common to the other pole of said rotor, at least one winding of said torque generator adapted to be connected to a D. C. signal input source and adapted upon energization to cooperate with said rotor to displace said rotor from said neutral position, and means including the output of said signl generator and connected to said torque generator for effecting a balance of said torque produced by said D. C. signal input, the output of said signal generator being proportional to a D. C. input signal to said torque generator.

14. In an electromechanical amplifier, a stator having a plurality of salient poles and a rotor element of magnetic material positioned within said stator and having polar projections which span substantially between centers of adjacent poles, torque generating means including a portion of said stator and said rotor common to one polar projection of said rotor having an input signal winding adapted to have a D. C. input signal supplied thereto for causing rotation of said rotor from a neutral position wherein the polar projections span substantially the angle between centers of adjacent poles, a signal generator formed by another portion of said stator and another polar projection of said rotor and including winding means energized from an alternating current source of power and additional winding means inductively associated therewith and adapted to have a signal output induced therein of variable phase and magnitude in proportion to displacement of said rotor from said neutral position, and circuit means connecting the output winding of said signal generator to said torque generator to balance the torque produced by said D. C. input signal.

15. In an electromechanical amplifier, a stator having a plurality of salient poles and a rotor element of magnetic material positioned within said stator and having polar projections which span substantially between centers of adjacent poles, torque generating means including a portion of said stator and said rotor common to one polar projection of said rotor and having an input signal winding adapted to have a D. C. input signal supplied thereto for causing rotation of said rotor from a neutral position wherein the polar projections span substantially the angle between centers of adjacent poles, a signal generator formed by another portion of said stator and another polar projection of said rotor and including winding means energized from an alternating current source of power and additional winding means inductively associated therewith and adapted to have a signal output induced therein of variable phase and magnitude in proportion to displacement of said rotor from said neutral position, and circuit means including an amplifying means energized from the output of said signal generator and connected to said torque generator for modifying the torque produced by the direct current input signal to said torque generator.

References Cited in the file of this patent

UNITED STATES PATENTS

| | | |
|---|---|---|
| 2,485,657 | Rex | Oct. 25, 1949 |
| 2,648,815 | Hassler | Aug. 11, 1953 |